(12) United States Patent
Sabol

(10) Patent No.: US 7,500,533 B1
(45) Date of Patent: Mar. 10, 2009

(54) FUEL SAVING CRUISE CONTROL SYSTEM

(76) Inventor: Albert Sabol, 120 Ramblewood Dr., Statesboro, GA (US) 30458

( * ) Notice: Subject to any disclaimer, the term of this patent is extended or adjusted under 35 U.S.C. 154(b) by 12 days.

(21) Appl. No.: 11/981,440

(22) Filed: Nov. 1, 2007

(51) Int. Cl.
*B60K 31/02* (2006.01)

(52) U.S. Cl. .................................. 180/178; 123/400

(58) Field of Classification Search ............. 180/170, 180/171, 178, 179; 123/361, 363, 399, 400
See application file for complete search history.

(56) References Cited

U.S. PATENT DOCUMENTS

| | | | | |
|---|---|---|---|---|
| 2,454,659 A | * | 11/1948 | Leonard | 180/178 |
| 4,132,284 A | * | 1/1979 | Tomecek | 180/179 |
| 4,408,293 A | | 10/1983 | Avins | |
| 4,741,165 A | * | 5/1988 | Kobus | 60/700 |
| 4,856,476 A | * | 8/1989 | Shirakawa | 123/342 |
| 4,932,375 A | * | 6/1990 | Burney | 123/361 |
| 5,033,433 A | * | 7/1991 | Churchill et al. | 123/361 |
| 5,165,497 A | * | 11/1992 | Chi | 180/169 |
| 5,749,427 A | * | 5/1998 | Satonaka et al. | 180/179 |
| 5,944,766 A | | 8/1999 | White | |
| 6,213,089 B1 | | 4/2001 | Cheng | |
| 6,470,256 B1 | | 10/2002 | Cikalo et al. | |
| 6,698,397 B2 | * | 3/2004 | Cook | 123/399 |
| 7,213,570 B2 | | 5/2007 | Zhang | |
| 7,233,854 B2 | | 6/2007 | Rayl et al. | |

* cited by examiner

*Primary Examiner*—Frank B Vanaman
(74) *Attorney, Agent, or Firm*—Norman B. Rainer

(57) ABSTRACT

An apparatus is provided for producing periodic lateral displacement of a cruise control cable associated with the engine of an automotive vehicle. The periodic displacement is produced by an activation arm which attaches to the cable and is caused to undergo reciprocal linear movement produced by a rotating disc that is driven at a controlled speed by a motor that operates off the electrical system of the vehicle.

6 Claims, 3 Drawing Sheets

FUEL SAVING CRUISE CONTROL SYSTEM

BACKGROUND OF THE INVENTION

1. Field of the Invention

This invention concerns apparatus for improving the fuel economy of an automotive vehicle, and more particularly relates to apparatus which interacts with a conventional cruise control system to provide greater mileage per unit of fuel consumed.

2. Description of the Prior Art

Electronic throttle controllers are well known for operating an engine throttle valve to control the rate of fuel flow to the combustion chamber of an engine. Typically, the throttle controller receives an acceleration input signal from the operator of the vehicle via an accelerator pedal. The farther the pedal is depressed, the more the throttle valve is opened, which permits more fuel to be consumed by the engine and the vehicle to travel faster.

Some throttle controllers can operate automatically as a "cruise control" to maintain the speed of the vehicle at a cruising speed set by the driver. The cruise control provides a convenient means for a driver to maintain vehicle speed without using foot pedals, which can be especially advantageous on long trips. Typically, such conventional cruise controls use an input from a speedometer or engine speed sensor to monitor the cruising speed of the vehicle. Due to varying terrain, friction and wind resistance the speed controller is nearly continuously correcting for deviations from the desired speed. Consequently, the throttle is constantly fluctuating to allow more or less fuel to be consumed by the engine to maintain the set speed.

A problem with such cruise controls is that the continuous throttle adjustments lower the fuel economy of the engine. This is primarily due to the inefficiencies involved with non-constant burning, which include counteracting momentum losses of the moving components of the engine as well as that of the overall vehicle.

Most cruise controls include stored error correction algorithms that define the response time and duration of the throttle adjustments. These algorithms are commonly designed with smoothness, accuracy and responsiveness being the highest priorities. Fuel economy is typically not a factor in the design of the algorithms.

U.S. Pat. No. 5,944,766 discloses a cruise control having control algorithms designed to improve the fuel economy of the vehicle. When it is sensed that the vehicle is gaining momentum, the algorithms instruct the speed controller to override the normal control of the throttle and set back the throttle position to a prescribed percentage (such as 50% or 80%) of its normal position. Thus, fuel consumption is minimized during and after the vehicle travels down hill. As such, the disclosed cruise control has only limited fuel saving benefits.

U.S. Pat. No. 6,213,089 discloses a system for achieving fuel economy by way of delivery of controlled pulses of fuel to a fuel injection mechanism. Although apparently feasible, this system does not easily adapt to interaction with a conventional cruise control system.

Accordingly, there exists a need for a cruise control with improved fuel economizing benefits.

It is therefore a primary object of the present invention to provide control apparatus for improving the fuel efficiency of a conventional cruise control system of an automotive vehicle.

It is a further object of this invention to provide control apparatus as in the foregoing object and operating method amenable to interaction with an existing conventional cruise control system.

It is another object of the present invention to provide control apparatus of the aforesaid nature of rugged, durable construction predisposed to low cost manufacture.

These objects and other objects and advantages of the invention will be apparent from the following description.

SUMMARY OF THE INVENTION

The above and other beneficial objects and advantages are accomplished in accordance with the present invention by an apparatus for providing reciprocating lateral displacement of a cruise control cable associated with an automotive engine having a lift lug, said apparatus comprising:

a) a motor operable by an automotive electrical source of 9 to 12 volts D.C. and having a front extremity from which an output shaft is forwardly emergent upon a straight axis, b) means for controlling the rotational speed of said output shaft, c) a gear box associated with said front extremity and housing gears which cause the axial rotation of said output shaft to rotate a secondary shaft upon an axis orthogonally disposed to the axis of said output shaft, d) a disc of substantially circular perimeter secured to said secondary shaft and rotatably positioned exteriorly of said gear box, and e) an activation arm having a distal extremity that engages said cruise control cable, and a proximal extremity pivotably attached to said disc adjacent its perimeter, whereby f) rotational movement of said disc produces reciprocating linear movement of said distal extremity with consequent reciprocating displacement of said cruise control cable.

The method of this invention involves employing the aforesaid apparatus in a manner whereby the periodic lateral displacement of said cruise control cable is between ⅜" and ⅝", and the frequency of said displacement is between about 45 and 50 cycles per minute.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing.

DESCRIPTION OF THE PREFERRED EMBODIMENT

Figure 1:
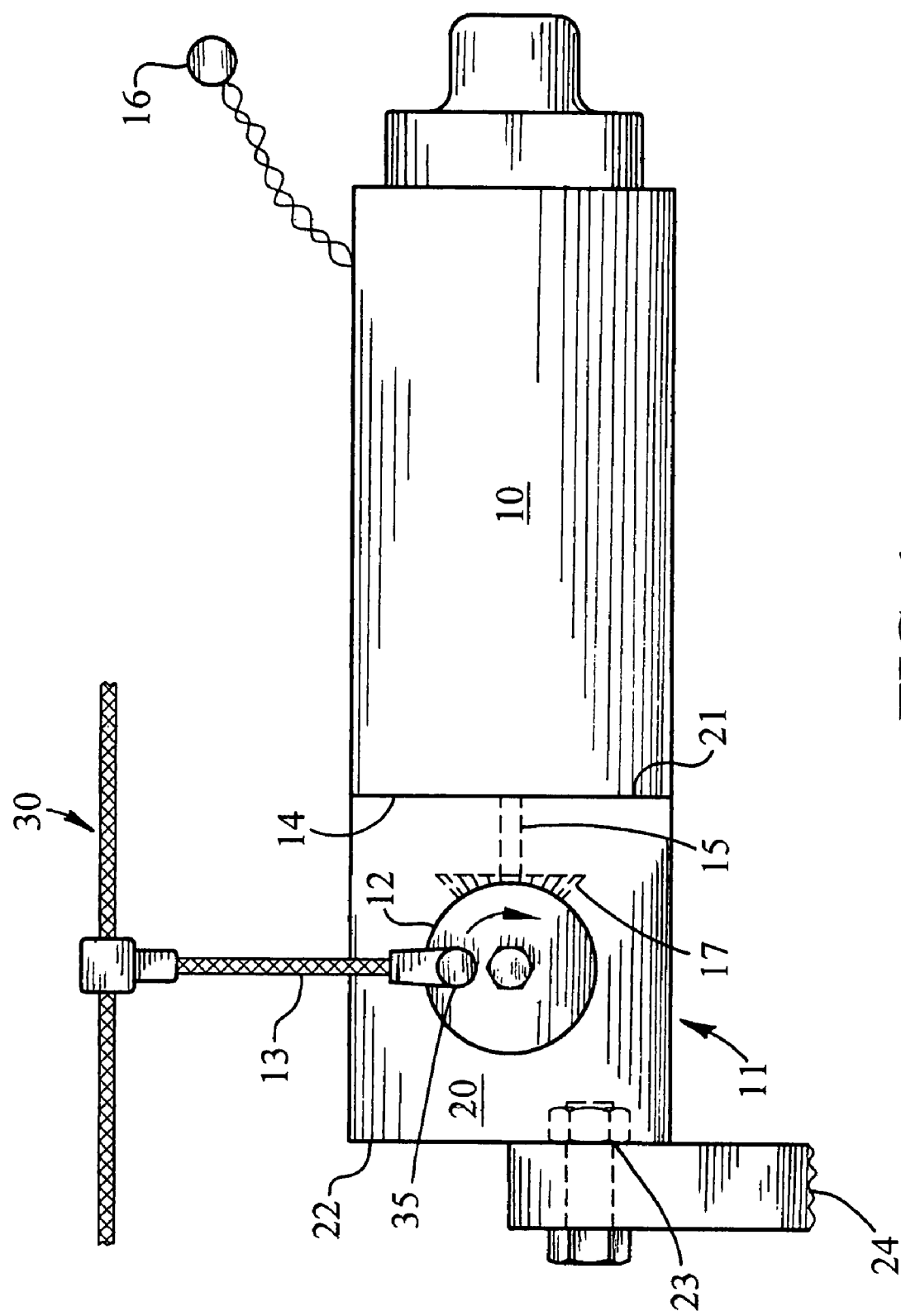
FIG. 1 is a side view of an embodiment of the apparatus of the present invention showing the activation arm in its outermost position.

Referring now to FIGS. 1-5, an embodiment of the apparatus of the present invention is shown comprised of a motor 10 and associated gearbox 11 that provides a rotating cam disc 12 which imparts reciprocal movement to an activation arm 13.

Motor 10 is operable by an automotive electrical source of 9 to 12 volts D.C. current. Said motor is preferably a commonplace windshield wiper motor having a front extremity 14 from which an output shaft 15 is forwardly emergent upon a straight axis. Said motor is capable of producing an adjustable rpm of said shaft in the range of about 45 to 50 rpm, said shaft rpm being controlled by a variable resistance electrical switch 16 positioned close to the steering wheel of the automotive vehicle.

Gearbox 11 is bolted or otherwise attached to front extremity 14 of the motor, and is comprised of rear panel 21, opposed parallel side panels 20, and front panel 22. Mounting means in the form of aperture 23 may be associated with said side or front panels to facilitate bolted securement of the apparatus to engine lift lug 24. A first bevel gear 17 is attached to shaft 15 and is interactive with second bevel gear 18 attached to secondary shaft 19 which is journaled through side panels 20. The effect of said gear arrangement is to cause secondary shaft 19 to rotate upon an axis which is orthogonal to the axis of output shaft 15.

One extremity 26 of secondary shaft 19 is caused to protrude through one side panel 20. Cam disc 12, preferably of circular perimeter 27 is fixedly mounted upon protruding extremity 26 and is adapted to rotate in a plane parallel to the associated side panel.

Activation arm 13 has a proximal extremity 35 pivotably attached to cam disc 12 adjacent its perimeter 27. Said activation arm extends to a distal extremity 29 that engages the control cable component 30 of a conventional cruise control system. Said engagement is such as to produce repetitive reciprocating displacement of said cable component by an amount of 4/8" to 5/8". In instances where the cable 30 is taut, the cable provides its own restorative force to regain the straight state 31 shown in FIG. 3. In such instances, activator arm 13 only provides a pulling force, and accordingly can be a flexible tether. In other instances however, where cable 30 is limp, said activator arm may be a rigid rod which provides pushing and pulling impetus.

Figure 2:
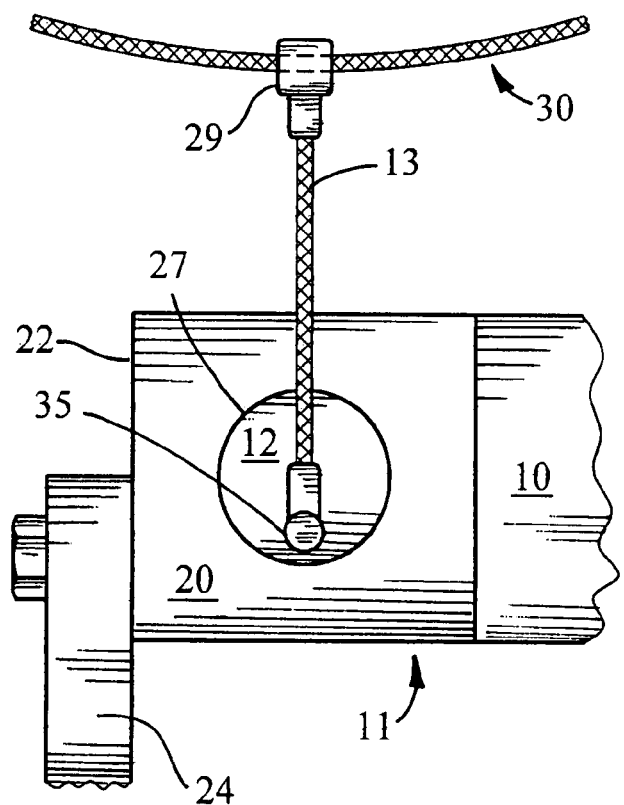
FIG. 2 is a fragmentary view of the embodiment of FIG. 1 showing the activation arm in its withdrawn position.
Figure 3:
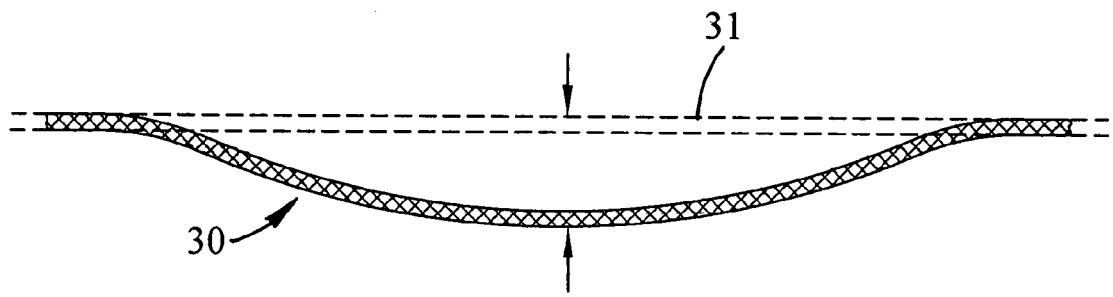
FIG. 3 illustrates the manner of reciprocating movement of said cruise control cable.
Figure 4:
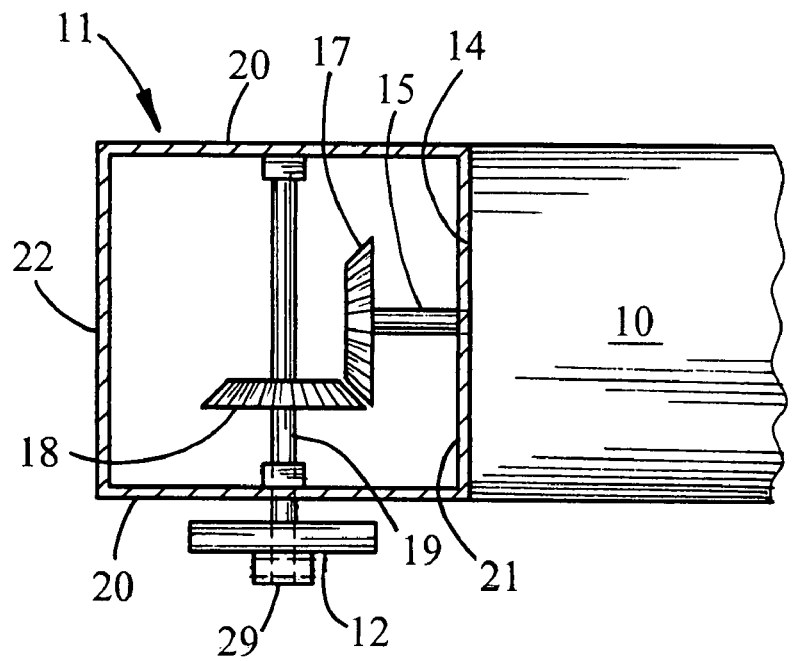
FIG. 4 is a fragmentary top view of the embodiment of FIG. 1.
Figure 5:
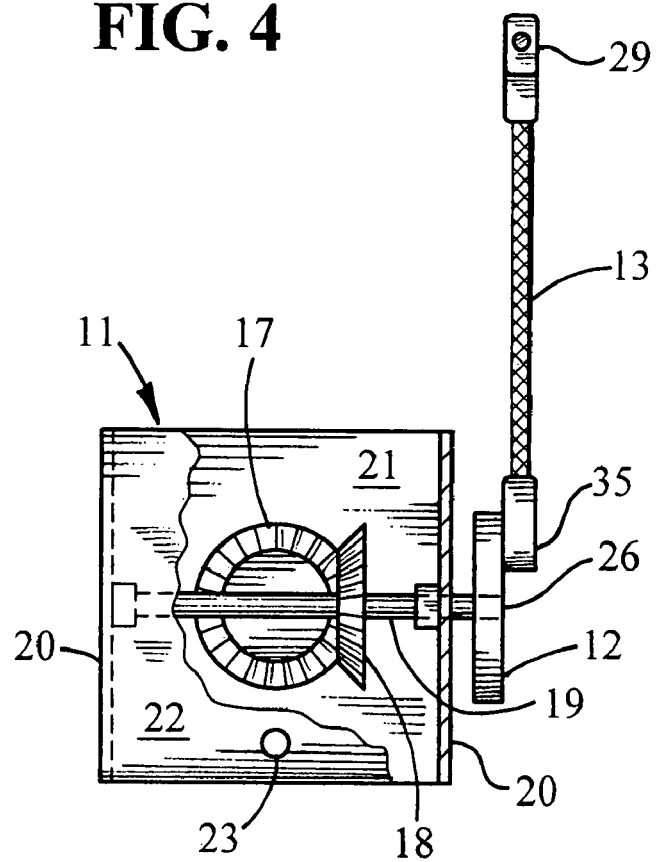
FIG. 5 is an end view taken from the left of FIG. 1, with portions broken away.

Cable 30, as shown in FIGS. 1 and 2, extends in one direction to the engine throttle component, and extends in the opposite direction to the monitoring and control component of said cruise control system. The repetitive movement of the cable in a direction transversely to its length produces on/off control of fuel supplied to the associated engine. It has been found that this effect, when conducted at a frequency of 45 to 50 cycles per minute, produces improved fuel efficiency.

The following example illustrates a preferred embodiment of this invention, and is not intended to limit the invention in any way.

EXAMPLE

An apparatus was constructed from a windshield wiper motor taken from a Ford 150 truck (1995 model) and labelled as part# 40-2002. The front extremity of the motor, having a forwardly directed output shaft, was bolted to a gear box. Within the gear box, a first bevel gear is mounted on the output shaft and is interactive with a second bevel gear mounted on a secondary shaft journaled to the walls of the gear box on an axis orthogonal to the axis of the output shaft. The secondary shaft emerges from the gear box and secures a cam disc. An activation arm is pivotably attached at its proximal extremity to the cam disc.

The aforesaid apparatus was secured to the lift lug of a 6 cylinder, 180 horsepower engine of a 2001 Buick Century vehicle, and the activation arm was caused to embrace the control cable of the factory installed cruise control unit. The reciprocating stroke of the activation arm was adjusted to produce 5/8" cyclical transverse displacement of the cable, and the motor speed was adjusted to produce 47 cycles/minute.

With such system in operation, and driving the vehicle at speeds between 60 and 70 miles per hour on a flat highway, a 43% reduction in fuel consumption was achieved.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. An apparatus for providing reciprocating lateral displacement of a cruise control cable associated with an automotive engine having a lift lug, said apparatus comprising:
   a) a motor operable by an automotive electrical source of 9 to 12 volts D.C. and having a front extremity from which an output shaft is forwardly emergent upon a straight axis,
   b) means for controlling the rotational speed of said output shaft,
   c) a gear box associated with said front extremity and housing gears which cause the axial rotation of said output shaft to rotate a secondary shaft upon an axis orthogonally disposed to the axis of said output shaft,
   d) a disc of substantially circular perimeter secured to said secondary shaft and rotatably positioned exteriorly of said gear box, and
   e) an activation arm having a distal extremity that engages said cruise control cable, and a proximal extremity pivotably attached to said disc adjacent its perimeter, whereby
   f) rotational movement of said disc produces reciprocating linear movement of said distal extremity with consequent reciprocating displacement of said cruise control cable.

2. The apparatus of claim 1 wherein said motor is a windshield wiper motor.

3. The apparatus of claim 1 wherein said reciprocating displacement covers a distance between 4/8 and 5/8 inch.

4. The apparatus of claim 3 wherein the frequency of said reciprocating displacement is between 45 and 50 cycles per minute.

5. The apparatus of claim 4 wherein said gear box is comprised of a front panel and parallel side panels, and said secondary shaft is journaled to said side panels.

6. The apparatus of claim 5 wherein the front panel of said gear box has means to facilitate attachment of said apparatus to the lift lug of said engine.

* * * * *